(12) United States Patent
Suzuki et al.

(10) Patent No.: US 7,696,254 B2
(45) Date of Patent: *Apr. 13, 2010

(54) METHOD OF PRODUCING LIQUID CRYSTAL EMULSION COMPOSITIONS

(75) Inventors: Takashi Suzuki, Yokohama (JP); Kenji Nakamura, Osaka (JP)

(73) Assignee: Kenji Nakamura, Osaka (JP)

( * ) Notice: Subject to any disclaimer, the term of this patent is extended or adjusted under 35 U.S.C. 154(b) by 762 days.

This patent is subject to a terminal disclaimer.

(21) Appl. No.: 11/560,766

(22) Filed: Nov. 16, 2006

(65) Prior Publication Data

US 2007/0149624 A1 Jun. 28, 2007

(30) Foreign Application Priority Data

Dec. 22, 2005 (JP) ............... 2005-369053

(51) Int. Cl.
*C09K 19/00* (2006.01)
*C09K 19/56* (2006.01)
*G03C 5/18* (2006.01)
*G03C 5/26* (2006.01)
*B01F 3/08* (2006.01)

(52) U.S. Cl. .................. 516/76; 516/72; 516/900; 516/902; 252/299.01

(58) Field of Classification Search .............. 516/72, 516/76, 900, 902; 252/299.01
See application file for complete search history.

(56) References Cited

U.S. PATENT DOCUMENTS

| 4,781,849 A | 11/1988 | Biresaw et al. | |
|---|---|---|---|
| 5,374,372 A * | 12/1994 | Broze et al. | 252/299.01 |
| 7,534,369 B2 * | 5/2009 | Suzuki et al. | 516/72 |
| 2005/0039253 A1 | 2/2005 | Yang et al. | |

FOREIGN PATENT DOCUMENTS

| EP | 0 418 986 A2 | 3/1991 |
|---|---|---|
| JP | 63-287718 | 11/1988 |
| JP | 04-224507 | 8/1992 |
| JP | 08-217633 | 8/1996 |
| JP | 09-124432 | 5/1997 |
| JP | 2003-212716 | 7/2003 |
| JP | 2007-009199 A | 1/2007 |
| WO | WO 01/34111 A1 * | 5/2001 |

OTHER PUBLICATIONS

C. Stubenrauch, et al., "A New Approach to Lamellar Phases (Lα) in Water—non-ionic surfactant systems," Liquid Crystals, vol. 31, No. 1, Jan. 2004, pp. 39-53.

* cited by examiner

*Primary Examiner*—Daniel S Metzmaier
(74) *Attorney, Agent, or Firm*—Kobbe Martens Olson & Bear, LLP

(57) ABSTRACT

A process of producing a highly stable liquid crystal emulsion composition with improved qualities, in which a conventional complicated and costly process that requires specific equipment is streamlined into a simple and less costly process. A method of producing a liquid crystal emulsion composition having liquid crystal structure, comprising the steps of admixing 3 to 8 parts by weight of a hydrophilic surfactant which is a polyoxyethylene polyoxypropylene alkyl ether having an HLB of 10 to 20 with 2 to 6 parts by weight of a lipophilic surfactant; admixing 5 to 10 parts by weight of the resulting admixture with 5 to 30 parts by weight of an oil component; admixing the obtained admixture with a mixture of 40 to 80 parts by weight of a water-soluble polyvalent alcohol and 8 to 40 parts by weight of water; and heating, homogeneously mixing and then cooling the thus obtained admixture.

13 Claims, 1 Drawing Sheet

100 times 200 times

METHOD OF PRODUCING LIQUID CRYSTAL EMULSION COMPOSITIONS

BACKGROUND OF THE INVENTION

1. Field of the Invention

The present invention relates to a method of producing a liquid crystal emulsion composition whose stability is improved so that the liquid crystal structure is not destroyed by dilution, with ease without applying shear force and without using specific equipment.

Further, the present invention relates to a method of producing a liquid crystal emulsion composition having an excellent stability by using hydrophilic surfactants having specific molecular structures with which specific components are admixed in specific mixing ratios.

2. Description of the Related Art

Conventionally, utilization of a liquid crystal phase for emulsification has been known. Examples of utilizable liquid crystals include lamellar liquid crystals, reverse hexagonal liquid crystals, and cubic liquid crystals and all of them produce characteristic emulsification systems. Among liquid crystal emulsion compositions, the liquid crystal structure with the use of higher alcohols has also been known; however the resulting products are extremely unstable and a base material for external application with the use of higher alcohols alone causes problems such as poor moisture tolerance, deposition of crystals, and reduction in viscosity. In order to ameliorate these problems, for example, the admixing of the higher alcohols with fatty acids-lipophilic nonionic surfactants, hydrophilic surfactants, polyvalent alcohols, and water has been proposed in the production of liquid crystal-type base material for external application (Patent Reference No. 1: Japanese Patent Laid-open No. 287718/1988); however, a process of applying stirring shock with the use of a homomixer, an ultrasonic emulsifier, a Manton Gaulin emulsifier, or the like is essential upon admixing these compounds to obtain the liquid crystals and thus an additional equipment cost is required.

Further, as for liquid crystal compositions, technology with the use of surfactants has been known. For example, complexes having liquid crystal structure with dipolar surfactants and/or semipolar surfactants, higher fatty acids, and water have been known (Patent Reference No. 2: Japanese Patent Laid-open 217633/1996). Further, it has also been known that a liquid crystal emulsion can be obtained with the use of ceramides which are present in a very small amount in the epidermis of mammals, in which cholesterols and fatty acids are admixed with ceramides in an oily agent, after which water-soluble polyvalent alcohol is added and the resulting admixture is mixed in an aqueous medium and then cooled (Patent Reference No. 3: Japanese Patent Laid-open No. 124432/1997). However, stirring shock by a Manton Gaulin has been required also in these known technologies.

Since the liquid crystal composition with the use of higher alcohols is extremely unstable and has many disadvantages as mentioned above, the admixing of oil components which are solid at room temperature, such as paraffin and Vaseline, while reducing the admixing ratio of higher alcohols, or the use of water-soluble polymers such as gum arabic, carboxyvinyl polymers, and hydroxypropyl cellulose has been proposed to solve these disadvantages; however, the resulting liquid crystal compositions are clouded, lose transparency that is unique to liquid crystals or have increased stickiness and lack the clean texture of liquid crystals.

The abovementioned Japanese Patent Laid-open No. 287718/1988 (Patent Reference No. 1) has also disclosed the use of decaglyceryl fatty acid esters, POE addition polyethylene glycol fatty acid esters, or POE addition hydrogenated castor oil as the hydrophilic surfactants in liquid crystal compositions; however, liquid crystals cannot be formed with these material components unless high shear force such as with a Manton Gaulin is applied.

Further, fatty acid glycerides having an HLB of 7 or less have been used as lipophilic surfactants. However, the process of the production is complicated, in which oil phase components and water phase components are separately admixed and heated and then the oil phase components are added to the water phase components to be pretreated using a homomixer, after which high shear force is applied by a Monton Gaulin or Manton Gaulin homogenizer. Since the hydrophobic bonding of the liquid crystals is weak, the liquid crystal structure is destroyed by dilution with water or the like to form white emulsified particles, which results in the formation of poorly stable liquid crystals.

Further, according to Japanese Patent Laid-open No. 212716/2003 (Patent Reference No. 4), an improved liquid crystal emulsion composition using oil components, higher alcohols, higher fatty acids, hydrophilic surfactants, lipophilic surfactants, water-soluble polyvalent alcohols, and water has been proposed. Here, the composition is composed of oil components, higher alcohols, higher fatty acids, nonionic surfactants, water-soluble polyvalent alcohols, and water and the liquid crystals are formed by setting the ratio of the oil components to nonionic surfactants to from 1:1 to 3:1 and the number of carbon atoms of the higher alcohols to from 12 to 24 and applying stirring shock. Application of high shear force using a homomixer and then a Manton Gaulin homogenizer or a Microfluidizer is required also in this technology.

As mentioned above, in conventional methods of producing liquid crystal compositions, processes of the production are complicated and costly since high shear force is applied to form liquid crystal structure and moreover, the resulting liquid crystals are poorly stable since the liquid crystal structure is destroyed by dilution with water or the like to change the liquid crystals from the transparent state to the state of opaque emulsified particles.

SUMMARY OF THE INVENTION

With the advance of microdispersion technology owing to the development of powerful shear forces in emulsification technology, a fair achievement has been made for the production of liquid crystal emulsion compositions by applying surfactants suitable for stirring shock and developing surfactants which are suited to the process in which powerful shear force is applied to material components. However, a specific equipment such as a Manton Gaulin homogenizer or a Microfluidizer is needed for the application of powerful shear force and a complicated production process is required since temperature shock or stirring shock is essential upon producing liquid crystals, which disadvantageously makes a big factor of high cost in the production of liquid crystal emulsion compositions.

Further, there are also problems in stability of the resulting liquid crystal emulsion compositions such that fine emulsified particles are intermingled to make the liquid crystals clouded or that liquid crystals are destroyed by dilution to generate white emulsified particles.

An object of the present invention is to solve the abovementioned problems by streamlining the production process for cost reduction and at the same time by improving qualitative stability.

In an embodiment, attention has been directed to the fact that in emulsification, there is difference between the degree of hydrophilicity and lipophilicity of surfactants which are effective in reducing the surface tension of emulsified fine particles and the degree of hydrophilicity and lipophilicity of surfactants which are necessary to obtain the strength of interface membrane by aligning liquid crystals on the lamellar surface. Accordingly, the degree of hydrophilicity and lipophilicity of surfactants which are effective in improving the stability of liquid crystals has been studied. As a result, the efficiency of production of liquid crystals and the qualitative stability have been assured by using surfactants having an extremely high hydrophilicity, which are specified by their molecular structures, and thus the problems have been solved.

An embodiment solved the abovementioned problems based on the following constituents.

[1] A process of producing a liquid crystal emulsion composition having liquid crystal structure, comprising the steps of (1) admixing 3 to 8 parts by weight of a hydrophilic surfactant (a) having an HLB of 10 to 20, which is a polyoxyethylene polyoxypropylene alkyl ether of the general formula below, with 2 to 6 parts by weight of a lipophilic surfactant (b); (2) admixing 5 to 14 parts by weight of the resulting admixture with 5 to 30 parts by weight of an oil component (c); (3) admixing the obtained admixture with a mixture obtained by mixing 40 to 80 parts by weight of water-soluble polyvalent alcohol (d) and 8 to 40 parts by weight of water (e); and heating, homogeneously mixing, and then cooling the thus obtained admixture.

General formula: $HO(C_2H_4O)_n—(C_3H_6O)_mR$ wherein n is an integer from 15 to 50, m is an integer from 4 to 16 and R is an alkyl group selected from those having 12 to 24 carbon atoms.

[2] The process of producing a liquid crystal emulsion composition according to [1], characterized in that the mixing ratio of the oil component (c) and the admixture of the surfactants ((a)+(b)) is from 1:1 to 3:1.

[3] The process of producing a liquid crystal emulsion composition according to [1] or [2], characterized in that the water-soluble polyvalent alcohol content in the mixture of water-soluble polyvalent alcohol (d) and water (e) is 60 to 90% by weight.

[4] A liquid crystal emulsion composition, characterized in that the liquid crystal emulsion composition produced by the method of the abovementioned according to [1], [2] or [3] is diluted with water, a mixture of water and a lower monovalent alcohol, or a mixture of water and a water-soluble polyvalent alcohol.

For purposes of summarizing the invention and the advantages achieved over the related art, certain objects and advantages of the invention are described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In the present disclosure where conditions and/or structures are not specified, the skilled artisan in the art can readily provide such conditions and/or structures, in view of the present disclosure, as a matter of routine experimentation.

Further aspects, features and advantages of this invention will become apparent from the detailed description of the preferred embodiments which follow.

DETAILED DESCRIPTION OF THE PREFERRED EMBODIMENT

Figure 1:
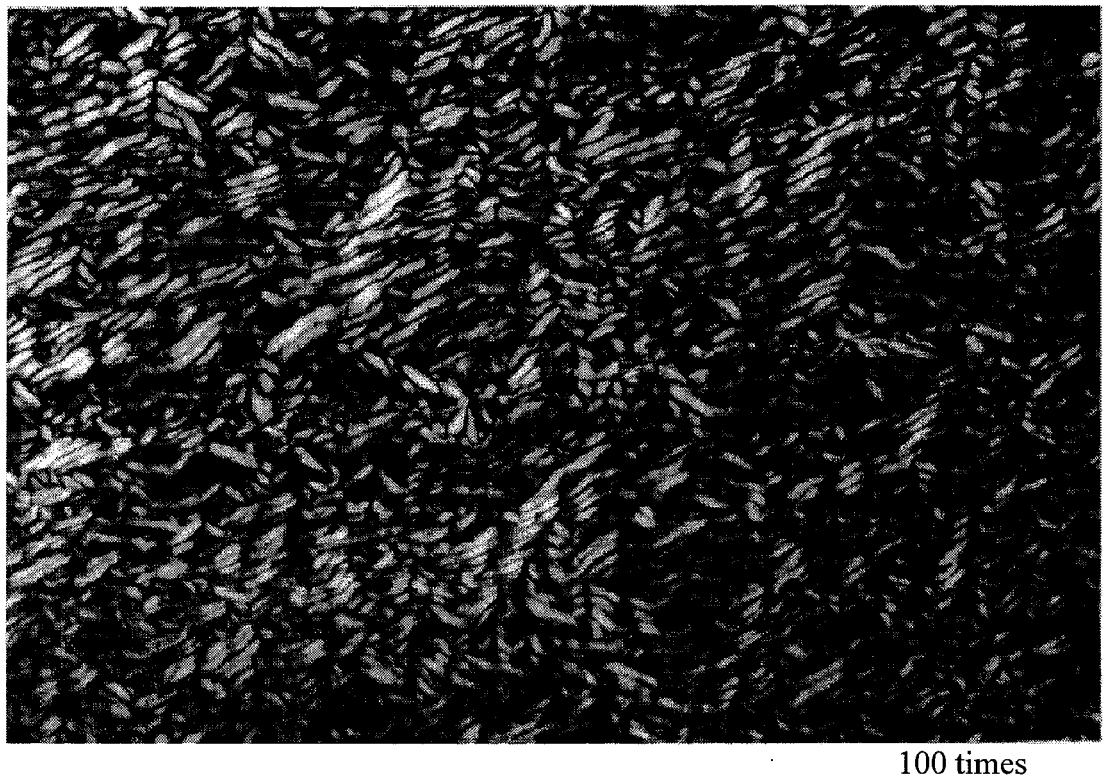
FIG. 1 is a polarization microscopic photograph of the liquid crystal emulsion composition obtained in Example 1 (100× magnification).

In an embodiment, in order to solve the abovementioned problems, a wedge effect of surfactants on liquid crystal formation is fortified to obtain stable liquid crystals. For this it is essential to use a hydrophilic surfactant comprising a polyoxyethylene (POE) polyoxypropylene (POP) alkyl ether having an HLB of 10 to 20 (wherein POE=15 to 50 moles, POP=4 to 16 moles and the number of carbon atoms in the alkyl group is 12 to 24).

Further, stable liquid crystal emulsion compositions comprising liquid crystals having a high strength of interface membrane can be obtained by admixing this essential component, a hydrophilic surfactant, with a lipophilic surfactant, an oil component, and a water-soluble polyvalent alcohol in a specific ratio.

Examples of the hydrophilic surfactant (a) to be used in an embodiment include "polyoxyethylene (20) polyoxypropylene (4) cetyl ether (HLB 16.5)", "polyoxyethylene (20) polyoxypropylene (8) cetyl ether (HLB 12.5)", "polyoxyethylene (20) polyoxypropylene (6) decyltetradecyl ether (HLB 11)", and "polyoxyethylene (30) polyoxypropylene (6) decyltetradecyl ether (HLB 12)".

The lipophilic surfactant (b) to be used in an embodiment is a lipophilic surfactant having an HLB of 5 or less which is selected from glyceryl monostearate, propylene glycol fatty acid esters, glycerin fatty acid esters, polyoxyethylene glycerin fatty acid esters, sorbitan fatty acid esters, sorbitol fatty acid esters, polyoxyethylene sorbitol fatty acid esters, and polyethylene glycol fatty acid esters.

Examples of the oil component (c) include cholesteryl stearate, diglyceryl stearate, glyceryl tristearate, chimyl stearate, beeswax, higher alcohols, and batyl alcohol as a solid oil component; Vaseline, hydrogenated castor oil stearate, hydrogenated Jojoba oil, glyceryl tricapryl-caprinate, and glyceryl triglycerate as a semisolid oil component; and squalane oil, silicone oil, liquid paraffin, isopropyl myristate, Jojoba oil, olive oil, Macadamia nut oil, synthetic isoparaffin, diisopropyl adipate, glyceryl tri-2-ethylhexanoate, octyldodecyl myristate, and cetostearyl alcohol as a fluid oil component. In an embodiment, the abovementioned solid oil component, semisolid oil component, and fluid oil component may be used alone, or in appropriate combination.

Examples of the water-soluble polyvalent alcohol (d) to be used include glycerin, diglycerin, polyglycerin, propylene glycol, dipropylene glycol, 1,3-butylene glycol, 1,4-butylene glycol, triethylene glycol, polyethylene glycol, sorbitol, xylitol, glucose, and maltitol.

As the oil component, any of the solid oil component, semisolid oil component and fluid oil component can be used; however, liquid crystal formation is often difficult with the use of the fluid oil component alone and thus it is preferable to use the three components in combination. When the oil phase components are poorly miscible, the solid oil component may crystallize with time and destroy the structure of liquid crystals.

In an embodiment, 5 to 30 parts by weight of an oil component are admixed with a mixture of 3 to 8 parts by weight of the abovementioned hydrophilic surfactants and 2 to 6 parts by weight of the abovementioned lipophilic surfactants and the resulting admixture is heated to and maintained at 70° C. The mixing ratio of the hydrophilic surfactants and the lipophilic surfactants is not particularly limited unless it is within the abovementioned range; however it is set to be a combination showing the liquid crystal region from the component system and preferably ranges from 1:1 to 3:1. Next, 8 to 40 parts by weight of water and 40 to 80 parts by weight of water-soluble polyvalent alcohols are admixed with the obtained surfactant mixture and the resulting admixture is heated to 70° C. and the amount of the water-soluble polyvalent alcohols in the water phase is adjusted to 60 to 90%. Further, the temperature is lowered to about 45° C., and thus the target liquid crystal emulsion composition can be obtained.

characterized by its fresh and clean feeling and an excellent long lasting effect in maintaining the moisture of the skin. Since liquid crystals show optical anisotropy, liquid crystal formation is confirmed by polarization microscopy. Formation of emulsified particles other than liquid crystals is confirmed by phase contrast microscopy.

Figure 2:
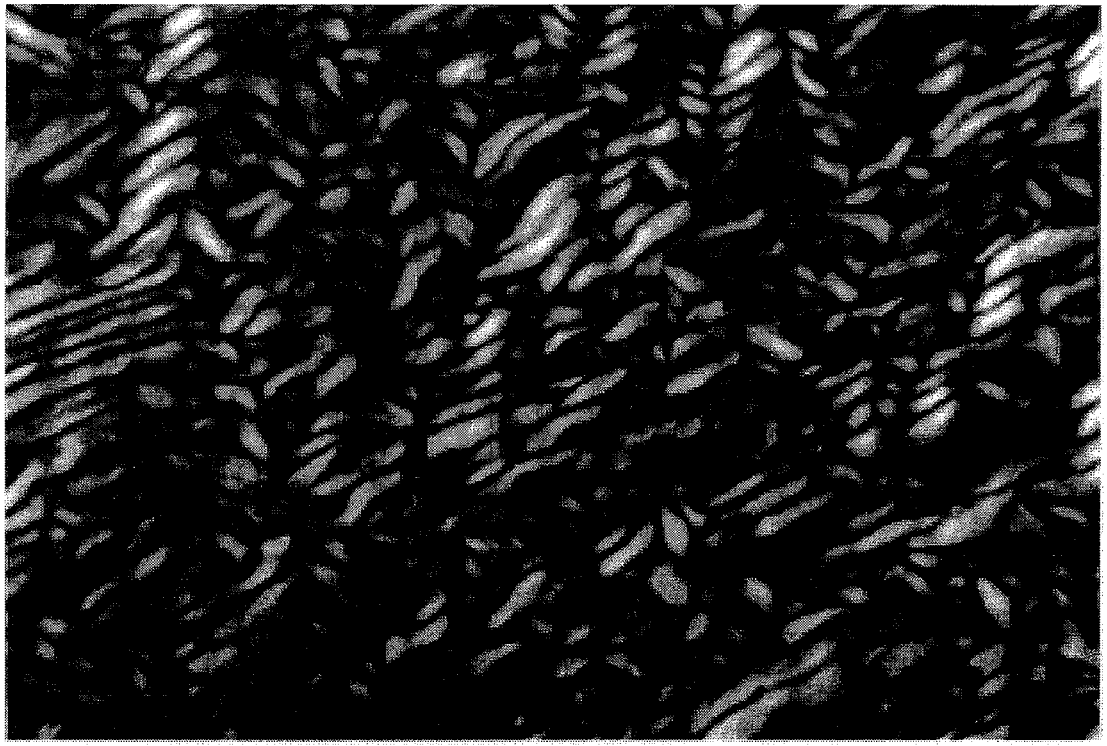
FIG. 2 is a polarization microscopic photograph of the liquid crystal emulsion composition obtained in Example 2 (200× magnification).

The formation of liquid crystals in Examples is shown by photographs taken using a polarization microscope as presented in FIG. 1 and FIG. 2.

Methods of embodiments will be explained more in detail by the following examples; however, these examples are not intended to limit the present invention.

Embodiments will be explained more specifically by the following examples.

TABLE 12

(The figures in the table indicate percent by weight unless otherwise provided.)

| Ingredient | Component | Ex. 1 | Ex. 2 | Comparative Example 1 | Comparative Example 2 | Comparative Example 3 |
|---|---|---|---|---|---|---|
| Hydrophilic surfactant | (1) PBC-34 | 8.0 | 4.0 | — | — | 4.0 |
| | (2) BC-23 | — | — | 6.0 | 4.0 | — |
| Lipophilic surfactant | (1) MGS-B | 4.0 | 2.5 | — | — | 2.0 |
| | (2) SS-10 | — | — | 6.0 | 2.5 | — |
| Oil component | (1) TIO | 3.0 | 3.0 | 2.0 | 3.0 | 6.0 |
| | (2) Vaseline | 3.0 | 5.0 | 2.0 | 5.0 | 6.0 |
| | (3) Squalane | 4.0 | 4.0 | 3.0 | 4.0 | 4.0 |
| | (4) STA | 5.0 | 5.0 | 3.0 | 5.0 | 6.0 |
| | (5) Hydroxy stearic acid | 2.0 | 2.0 | 2.0 | 2.0 | 2.0 |
| | Total | 17.0 | 19.0 | 12.0 | 19.0 | 24.0 |
| Surfactant:oil component | | 1:1.4 | 1:2.9 | 1:1.0 | 1:2.9 | 1:4.0 |
| Water-soluble polyvalent alcohol | (1) Glycerin | 28.0 | 29.0 | 30.0 | 29.0 | 30.0 |
| | (2) 1,3 BG | 20.0 | 20.5 | 21.0 | 20.5 | 20.0 |
| | Concentration in water phase | 67% | 66% | 67% | 66% | 71% |
| Water | Purified water | 23.0 | 25.0 | 25.0 | 25.0 | 20.0 |
| Characters | | | | | | |
| At a 2-fold dilution with purified water | Appearance | Apparently transparent cream | Apparently transparent cream | Milky white cream | Milky white cream | Milky white cream |
| | Phase contrast microscopy | — | — | Submicron particles 0.2-0.5 μ | Submicron particles 0.2-0.5 μ | Submicron particles 0.2-0.5 μ |
| | Polarization microscopy | All liquid crystals | All liquid crystals | A small quantity of liquid crystals | A small quantity of liquid crystals | A small quantity of liquid crystals |
| | Viscosity, mPa · sec | 19,000 | 21,000 | 16,000 | 17,000 | 18,000 |

In the conventional liquid crystal emulsion compositions, such stability cannot be obtained because the liquid crystals are destroyed upon dilution, which causes cloudiness. In the liquid crystal emulsion composition produced by the method according to an embodiment of the present invention, the structure of liquid crystals is not destroyed when diluted with water, water/lower monovalent alcohol solution or a water/water-soluble polyvalent alcohol solution and thus the state of dispersion of liquid crystals can be maintained.

Further, conventional liquid crystal emulsion compositions are white and cause whitening upon application on the skin and the white color inevitably remains for long on the surface of the skin, whereas the liquid crystal emulsion composition according to an embodiment of the present invention is an apparently transparent cream and causes no whitening. The product is a paste having a viscosity of 18,000 to 25,000 mPa·sec and has no "stickiness" like emulsified cream. It is Note: components in the table are as follows:

PBC-34—Nikkol PBC-34, a product of Nikko Chemicals Co., Ltd.: polyoxyethylene (20) polyoxypropylene (4) cetyl ether (HLB 16.5)

BC-23—Nikkol BC-23, a product of Nikko Chemicals Co., Ltd.: polyoxyethylene (23) cetyl ether (HLB 18.0)

MGS-B—Nikkol MGS-B, a product of Nikko Chemicals Co., Ltd.: glycerin monostearate (HLB 3.0)

SS-10—Nikkol SS-10, a product of Nikko Chemicals Co., Ltd.: sorbitan monostearate (HLB 4.7)

TIO: glyceryl tri-2-ethylhexanoate

STA: cetostearyl alcohol

TABLE 2

(The figures in the table indicate percent by weight unless otherwise provided.)

| Group | Component | Example 3 | Example 4 | Example 5 | Example 6 | Comparative Ex. 4 | Comparative Ex. 5 |
|---|---|---|---|---|---|---|---|
| Hydrophilic surfactant | (1) PBC-34 | 8.0 | — | 8.0 | — | 8.0 | — |
|  | (2) PEN-4630 | — | 8.0 | — | 8.0 | — | 8.0 |
| Lipophilic surfactant | (1) WGS-B | 4.0 | — | 4.0 | — | 4.0 | — |
|  | (2) WGS-TGL | — | 4.0 | — | 4.0 | — | 4.0 |
| Oil component | (1) TIO | 4.0 | 4.0 | 4.0 | 4.0 | 4.0 | 4.0 |
|  | (2) Vaseline | 3.0 | 3.0 | 3.0 | 3.0 | 3.0 | 3.0 |
|  | (3) Squalane | 4.0 | 4.0 | 4.0 | 4.0 | 4.0 | 4.0 |
|  | (4) STA | 5.0 | 5.0 | 5.0 | 5.0 | 5.0 | 5.0 |
|  | (5) Hydroxy stearic acid | 2.0 | 2.0 | 2.0 | 2.0 | 2.0 | 2.0 |
|  | Total | 18.0 | 18.0 | 18.0 | 18.0 | 18.0 | 18.0 |
| Water-soluble polyvalent alcohol | (1) Glycerin | 27.0 | 33.0 | 35.5 | 28.0 | 20.0 | 15.0 |
|  | (2) 1,3 BG | 20.0 | 21.0 | 23.5 | 22.0 | 15.0 | 15.0 |
|  | Concentration in water phase | 67.0% | 77.0% | 84.0% | 71.0% | 50.0% | 42.0% |
| Water | Purified water | 23.0 | 16.0 | 11.0 | 20.0 | 35.0 | 40.0 |
| Characters |  |  |  |  |  |  |  |
| At a 2-fold dilution with purified water | Appearance | Apparently transparent cream | | | | Milky white cream | |
|  | Phase contrast microscopy | — | — | — | — | Submicron particles 0.2-0.5 μ | Fine particles 1.0-3.0 μ |
|  | Polarization microscopy | All liquid crystals | | | | A small quantity of crystals | |
|  | Viscosity, mPa·sec | 19,000 | 21,000 | 22,000 | 21,000 | 17,000 | 15,000 |

<Mixing Ratio>

Effect of hydrophilic surfactants on liquid crystal formation was studied in Examples (PBC-34, PEN-4630) and Comparative Examples (BC-23).

In Example 1 and Example 2, a hydrophilic surfactant (PBC-34) and a lipophilic surfactant (MGS-B) were combined and the mixing ratio of the total surfactants and the oil component was set to be 1:1.4 to 1:2.9. The liquid crystal emulsion compositions obtained were apparently transparent creams having a viscosity of 19,000 to 21,000 mPa·sec and were entirely composed of liquid crystals. Polarization microscopic photographs of the liquid crystal emulsion compositions obtained in Examples 1 and 2 are shown in FIG. 1 and FIG. 2.

In Comparative Example 1 and Comparative Example 2, a hydrophilic surfactant (BC-23) for comparison was combined with a lipophilic surfactant (SS-10) and the mixing ratio of the total surfactants and the oil component was set to be 1:1 and 1:2.9. In Comparative Example 3, the mixing ratio beyond the limit of an embodiment (total surfactants:oil component=1:4) was used.

<Preparation>

According to the combination shown in Table 1, the surfactants (hydrophilic+lipophilic) and the oil components were admixed and the resulting admixture was heated to and maintained at 70° C. Separately, a water-soluble polyvalent alcohol and water were admixed and the resulting mixture was heated to and maintained at 70° C. Both admixtures were combined and cooled to 45° C. to obtain individual liquid crystal compositions.

<Evaluation of Table 1>

The products in Example 1 and Example 2 were apparently transparent creams having a viscosity of 19,000 to 21,000 mPa·sec with a fresh feeling without "stickiness" and were confirmed to be entirely composed of liquid crystals by polarization microscopy.

In contrast, the products in Comparative Examples 1, 2, and 3 were milky white creams and the formation of emulsified particles of 0.2 to 0.5μ was confirmed by phase contrast microscopy.

<Evaluation of Table 2>

In Examples and Comparative Examples in Table 2, effects of the concentration of water-soluble polyvalent alcohols in the water phase on liquid crystal formation were tested.

In Examples 3 to 6 and Comparative Examples 4 and 5, PEN-4630 (Nikkol PEN-4630, a product of Nikko Chemicals Co., Ltd.), i.e., polyoxyethylene (30) polyoxypropylene (6) decyltetradecyl ether (HLB 12.0), was used as a hydrophilic surfactant in addition to the abovementioned PBC-34. As a lipophilic surfactant, the abovementioned MGO or SS-10 was used.

When the concentration of polyvalent alcohols in the water phase was less than 60%, i.e., 50% and 42%, the resulting compositions were mainly composed of milky white emulsified particles and only a small amount of liquid crystals were formed.

As a result, it was confirmed that the concentration of polyvalent alcohols in the water phase ranging from 60 to 90% was effective.

<Liquid Crystal Emulsion Compositions of an Embodiment>

Conventional liquid crystal compositions have a problem that liquid crystals are destroyed and turn into white emulsified particles when diluted with water, water/lower monovalent alcohol, or water/water-soluble polyvalent alcohol since the liquid crystals are poorly stable.

In contrast, the liquid crystal emulsion composition of an embodiment is highly stable so that the liquid crystal structure is evidently not destroyed and thus no white emulsified particle is formed when diluted with water, water/lower monovalent alcohol, or water/water-soluble polyvalent alcohol.

The present application claims priority to Japanese Patent Application No. 2005-369053, filed Dec. 22, 2005, the disclosure of which is incorporated herein by reference in their entirety.

What is claimed is:

1. A method of producing a liquid crystal emulsion composition having liquid crystal structure, comprising the steps of:
   (i) admixing 3 to 8 parts by weight of a hydrophilic surfactant A having an HLB of 10 to 20, which is a polyoxyethylene polyoxypropylene alkyl ether of general formula $HO(C_2H_4O)_n$—$(C_3H_6O)_mR$, where n is an integer from 15 to 50, m is an integer from 4 to 16, R is an alkyl group selected from those having 12 to 24 carbon atoms, with 2 to 6 parts by weight of a lipophilic surfactant B;
   (ii) admixing 5 to 14 parts by weight of the resulting admixture obtained from step (i) with 5 to 30 parts by weight of an oil component C;
   (iii) admixing the resulting admixture obtained from step (ii) with a mixture obtained by mixing 40 to 80 parts by weight of water-soluble polyvalent alcohol D and 8 to 40 parts by weight of water E; and
   (iv) heating, homogeneously mixing, and then cooling the admixture obtained from step (iii).

2. The method according to claim 1, wherein a mixing ratio of the oil component C to the admixture of the surfactants A and B is from 1/1 to 3/1.

3. The method according to claim 1, wherein a water-soluble polyvalent alcohol content in the admixture of the water-soluble polyvalent alcohol D and the water E is 60% to 90% by weight.

4. The method according to claim 2, wherein a water-soluble polyvalent alcohol content in the admixture of the water-soluble polyvalent alcohol D and the water E is 60% to 90% by weight.

5. The method according to claim 1, wherein step (ii) further comprises heating and maintaining the admixture of the oil component C and the admixture of the surfactants A and B at approximately 70° C.

6. The method according to claim 1, wherein a mixing ratio of the hydrophilic surfactant A to the lipophilic surfactant B ranges from 1/1 to 3/1.

7. The method according to claim 1, wherein in step (iv), the admixture from step (iii) is heated at approximately 70° C.

8. The method according to claim 1, wherein in step (iv), the admixture from step (iii) is cooled to approximately 45° C.

9. A diluted liquid crystal emulsion composition comprising:
   the liquid crystal emulsion composition obtained by claim 1; and
   a diluent which is water, a solution containing water and lower monovalent alcohol, or a solution containing water and water-soluble polyvalent alcohol,
   wherein the diluted liquid crystal emulsion composition maintains a liquid crystal structure.

10. The liquid crystal emulsion composition according to claim 9, wherein a mixing ratio of the oil component C to the admixture of the surfactants A and B is from 1/1 to 3/1.

11. The liquid crystal emulsion composition according to claim 9, wherein a water-soluble polyvalent alcohol content in the admixture of the water-soluble polyvalent alcohol D and the water E is 60% to 90% by weight.

12. The liquid crystal emulsion composition according to claim 9, which is transparent cream and forms substantially no white emulsified particle therein.

13. The liquid crystal emulsion composition according to claim 9, which has a viscosity of 18,000 to 25,000 mPa·sec.

* * * * *